United States Patent
Chen et al.

(10) Patent No.: US 8,817,058 B2
(45) Date of Patent: *Aug. 26, 2014

(54) SYSTEM AND METHOD FOR REDUCING SCAN LINE JITTER IN A LASER SCAN UNIT FOR AN IMAGING DEVICE

(75) Inventors: Fei Chen, Lexington, KY (US); Craig Eric Hadady, Cynthiana, KY (US); Christopher Dane Jones, Georgetown, KY (US); John Lemaster, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/464,917

(22) Filed: May 4, 2012

(65) Prior Publication Data

US 2012/0281996 A1 Nov. 8, 2012

Related U.S. Application Data

(60) Provisional application No. 61/483,635, filed on May 6, 2011.

(51) Int. Cl.
*B41J 2/435* (2006.01)
*G03G 15/043* (2006.01)
*G02B 26/10* (2006.01)
*G03G 15/04* (2006.01)

(52) U.S. Cl.
CPC .......... *G02B 26/10* (2013.01); *G03G 15/04072* (2013.01)
USPC .............................................. 347/234; 399/51

(58) Field of Classification Search
CPC ......................... G02B 26/10; G03G 15/04072
USPC .............. 347/234, 250, 115; 399/51; 356/127
See application file for complete search history.

(56) References Cited

U.S. PATENT DOCUMENTS

| | | | | |
|---|---|---|---|---|
| 5,808,658 | A | * | 9/1998 | Hoover ........................ 347/250 |
| 6,163,327 | A | * | 12/2000 | Mori et al. .................... 347/115 |
| 2006/0092405 | A1 | * | 5/2006 | Higashi et al. ............... 356/127 |
| 2013/0121713 | A1 | * | 5/2013 | Chen et al. ..................... 399/51 |

* cited by examiner

*Primary Examiner* — Laura Martin
*Assistant Examiner* — Carlos A Martinez
(74) *Attorney, Agent, or Firm* — William F. Esser

(57) ABSTRACT

A system and method for reducing scan line jitter in laser scan systems employing a rotating mirror, including a controller for determining a unique time delay for each mirror facet and controlling laser sources so that video provided by each laser source is delayed in a scan line by the unique time delay corresponding to the mirror facet used in creating the scan line. The controller computes a facet map signature vector corresponding to each mirror facet matches the signature to a previously stored signature and assigns measured distance offset data to the mirror facets based upon the matching.

20 Claims, 7 Drawing Sheets

```
MinSm = 1e6;

for (i=0; i<count; i++)   //count is the size of the vectors

{ pSumValues[i] =0;   //Initialize sum for (j=0; j<count; j++)

{ pSumValues[i] += (pShiftedVector[j] – InputpData1[j])

*(pShiftedVector[j] – InputpData1[j] );

} pSumvalues[i] = sqrt(pSumvalues[i]);   //Compute distance if (pSumValues[i] < Minsm)

{

Minsm = pSumValues[i];

minsum_index = i;

}

ShiftVector(pShiftVector, count, SHIFT_VECTOR_RIGHT);

SYSTEM AND METHOD FOR REDUCING SCAN LINE JITTER IN A LASER SCAN UNIT FOR AN IMAGING DEVICE

CROSS REFERENCES TO RELATED APPLICATIONS

Pursuant to 35 U.S.C. §119, this application claims the benefit of the earlier filing date of Provisional Application Ser. No. 61/483,635, filed May 6, 2011, entitled "Laser Scan Unit for an Imaging Device," the content of which is hereby incorporated by reference herein in its entirety.

BACKGROUND

1. Technical Field

The present application relates generally to electronic devices having a laser scan unit (LSU), and particularly to an improved electrophotographic devices having reduced jitter and scan line variability for off-axis based LSU systems.

2. Description of the Related Art

Laser scanning systems, such as those utilized in color electrophotographic imaging devices, typically include a plurality of laser sources, each of which generates a laser beam containing data to be imaged onto a media sheet, a rotating polygonal mirror from which the laser beams reflect such that each beam impinges on a distinct photoconductive drum in a scan pattern formed by a plurality of parallel scan lines. There are some characteristics associated with laser scanning systems which adversely impact the quality of an imaged sheet.

For example, a number of motor and mirror characteristics are seen to be a root cause of scan line shift (jitter) and scan line length variation in a laser scanning unit. When jitter and scan line length variation occur, halftoned images can experience a degraded quality especially when using higher lines per inch (LPI) halftone screens. Essentially, the once per motor revolution variance interacts with the screen pattern.

One such characteristic is pyramidal angle error (PAE), which is the error associated with the incident beam angle θ from normal when viewing the polygon mirror 102 from the side. See FIG. 1. In horizontal synchronization (hsync) based systems that have two laser sources 104 on one side of the LSU, PAE causes the beams to hit the first lens of the LSU at varying locations and depending on the scan power in that lens can induce scan jitter.

Another characteristic, motor runout, is a measure of the variation in distance from the laser to the center of each facet and is caused by misaligned mounting by a distance X of the mirror center onto the motor shaft driving the mirror. In an off-axis system, this causes the line length of a scan to vary from facet to facet. Motor runout is also illustrated in FIG. 1.

Smaller sized laser printers are forcing its laser scanning units into a smaller space which leads designers to off-axis system scanning architectures. Such off-axis architectures result in the design being more susceptible to the characteristics mentioned above. Purchasing minors that have low PAE and motors that have low runout can add about $1 to $2 per laser scanning unit.

What is needed, then, is an improved LSU system which reduces or substantially eliminates scan jitter and scan line length variation.

SUMMARY

Example embodiments overcome the shortcomings of prior systems and thereby satisfy a significant need for a scanning system which reduces scan jitter and scan line variability on a facet-to-facet basis utilizing an off-axis laser scanning architecture. Example embodiments may apply to LSUs having synchronization sensors associated with each laser channel as well as to LSU's having a synchronization sensor associated with a single channel while other channels image off of other mirror facets. In general terms, facet timing information is maintained in system memory at time of manufacture, and the imaging device performs similar facet timing measurements and matches the measured facet timing with the stored facet timing information to substantially correct scan line length and jitter based upon the match.

In particular, an example embodiment of a scanning system may include a rotating mirror having a plurality of facets; a plurality of laser sources, with each laser source positioned in proximity to the rotating mirror for generating a laser beam directed thereat; and sensing circuitry for receiving at least one of the laser beams reflected by the facets of the rotating minor and for generating a corresponding horizontal synchronization signal in response to the reception. A controller of the scanning system may be configured to determine a facet map signature for the rotating mirror based upon the horizontal synchronization signal, the facet map signature being a vector of a size corresponding to a number of facets of the rotating mirror; and match, on a per facet basis, the determined facet map signature to a previously stored facet map signature. The previously stored facet map signature may be placed in memory at the time of manufacture of the scanning system, for example. The controller may also determine a unique time delay for each facet of the rotating minor based upon the match, and control the laser sources so that video provided by each laser source is delayed in a scan line by the unique time delay corresponding to the facet of the rotating minor used in creating the scan line.

BRIEF DESCRIPTION OF THE DRAWINGS

The above-mentioned and other features and advantages of the various embodiments, and the manner of attaining them, will become more apparent and will be better understood by reference to the accompanying drawings, wherein:

FIG. 7 shows a sample code listing for performing pattern matching of facet map signature vectors according to an example embodiment.

DETAILED DESCRIPTION

Figure 1:
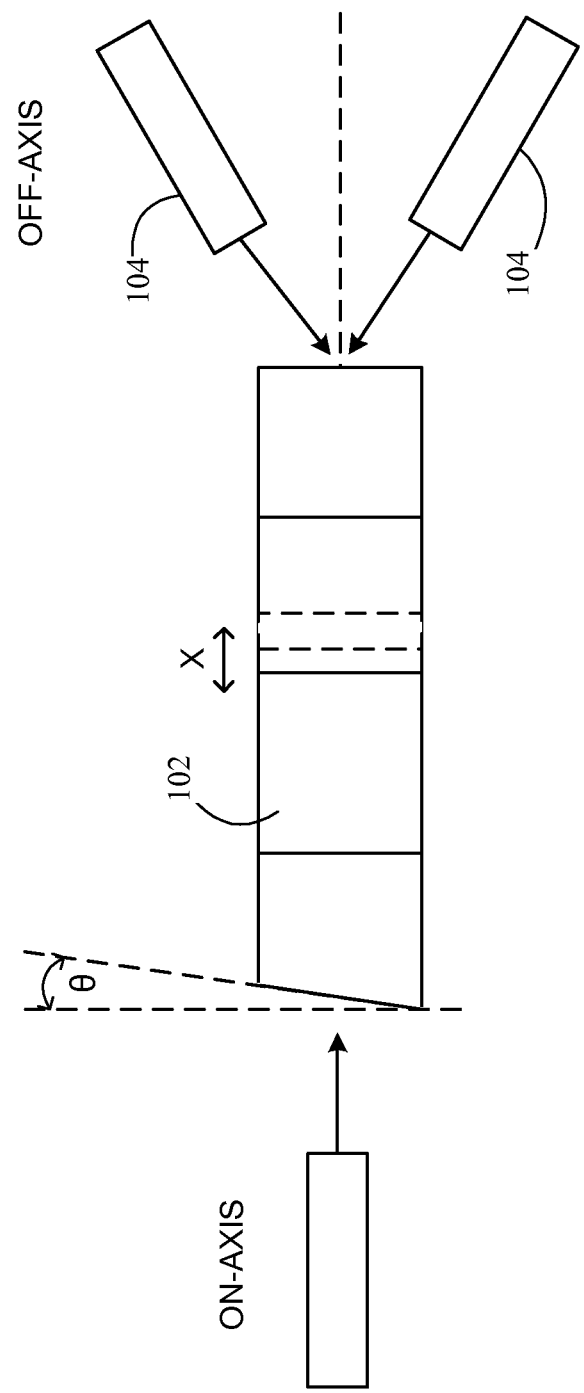
FIG. 1 illustrates sources of scan misalignment in a scanning system.

The following description and drawings illustrate embodiments sufficiently to enable those skilled in the art to practice it. It is to be understood that the subject matter of this application is not limited to the details of construction and the arrangement of components set forth in the following description or illustrated in the drawings. The subject matter is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present application as defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Example embodiments may be implemented in hardware in an integrated circuit, such as an Application Specific Integrated Circuit ("ASIC"). It is understood, however, that example embodiments may be at least partly implemented by a general purpose processor or microcontroller.

Figure 2:
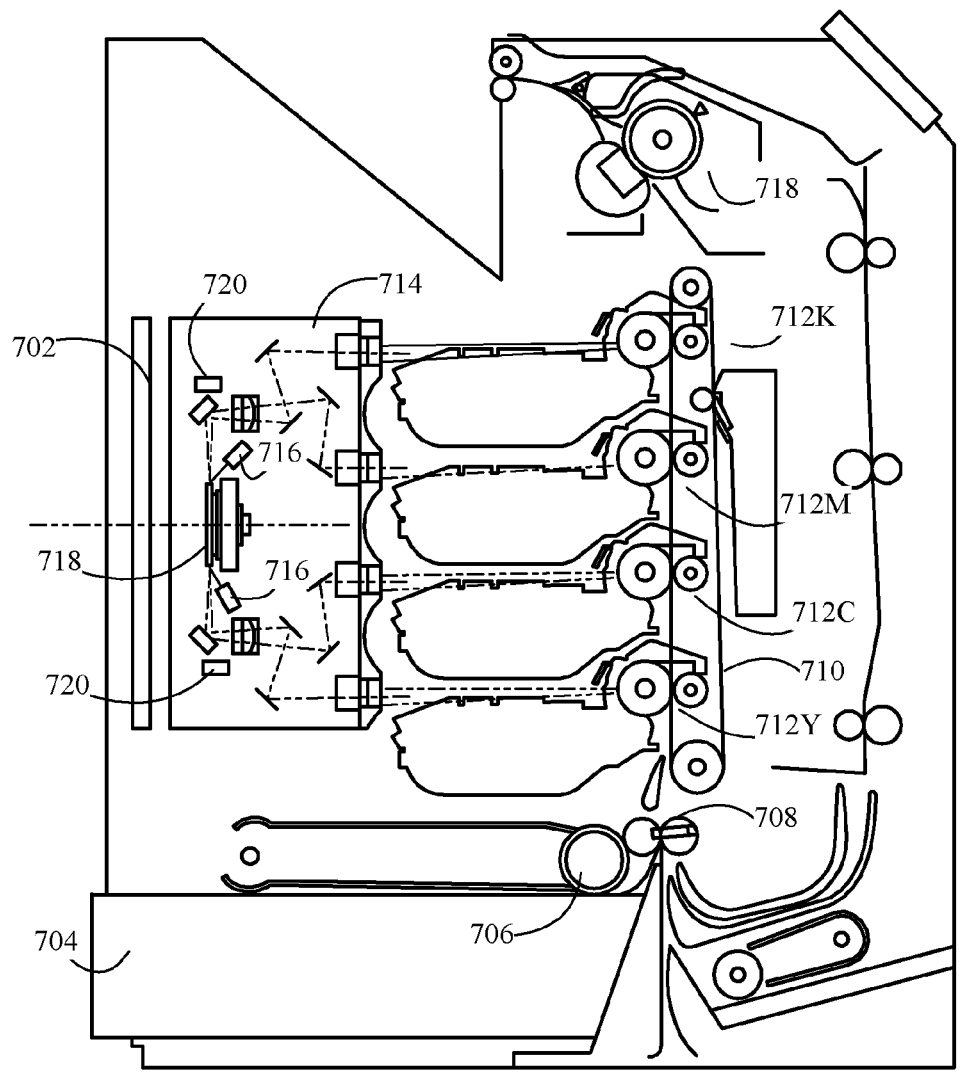
FIG. 2 is a side view of an electrophotographic imaging device incorporating the circuitry and algorithms of the example embodiments.

Referring now to the drawings and particularly to FIG. 2, there is shown an electrophotographic image forming apparatus 700, in this case a color laser printer. An image to be printed is electronically transmitted to a print engine processor or controller 702 by an external device (not shown) or may comprise an image stored in a memory of the controller 702. The controller 702 includes system memory, one or more processors, and other logic necessary to control the functions of electrophotographic imaging.

In performing a print operation, the controller 702 initiates an imaging operation where a top substrate of a stack of media is picked up from a media or storage tray 704 by a pick mechanism 706 and is delivered to a substrate transport apparatus formed by a pair of aligning rollers 708 and a substrate transport belt 710 in the illustrated embodiment. The substrate transport belt 710 carries the picked substrate along a substrate path past each of four image forming stations 712 which apply toner to the substrate. The image forming station 712K includes a photoconductive drum that delivers yellow toner to the substrate in a pattern corresponding to a black (K) image plane of the image being printed. The image forming station 712M includes a photoconductive drum that delivers magenta toner to the substrate in a pattern corresponding to the magenta (M) image plane of the image being printed. The image forming station 712C includes a photoconductive drum that delivers cyan toner to the substrate in a pattern corresponding to the cyan (C) image plane of the image being printed. The image forming station 712Y includes a photoconductive drum that delivers yellow toner to the substrate in a pattern corresponding to the yellow image plane of the image being printed. The controller 702 regulates the speed of the substrate transport belt 710, substrate pick timing, and the timing of the image forming stations 712 to effect proper registration and alignment of the different image planes to the substrate.

To effect the imaging operation, the controller 702 manipulates and converts data defining each of the KMCY image planes into separate corresponding laser pulse video signals, and the video signals are then communicated to the LSU or printhead 714. The printhead 714 may include four laser light sources 716 (only two illustrated for reasons of clarity), at least one polygonal mirror 718 supported for rotation about a rotational axis, an hsync sensor 720 associated with each laser light source 716 for generating a start of scan (SOS) signal when impinged by a corresponding laser beam to trigger the timing associated with a scan line, and post-scan optical systems receiving the light beams emitted from the laser light sources 716. Each laser of the laser light sources 716 emits a respective laser beam which is reflected off the rotating polygonal mirror 718 and is directed towards a photoconductive drum of a corresponding image forming station 712 by select lenses and mirrors in the post-scan optical systems of printhead 714. Following impingement of laser beams across the photoconductive drums, toner is collected onto the impinged regions which is then transferred to the substrate sheet, after which the transferred toner is fused onto the sheet as it passes through fuser 178, which fuses the toner by application of heat and pressure.

Example embodiments utilize a technique in which the printhead 714 is characterized at the time of manufacture, including characterizing facet-to-facet variation of mirror 718, the characterization results of which are stored in memory of image forming apparatus 700, such as memory associated with controller 702. During operation of image forming apparatus 700, such as at the beginning of a print job, printhead 714 is characterized in a similar manner, after which the stored characterization data is compared with the recently characterized data, and pattern matching is performed to best match characterization data for each facet. Following the pattern matching, the characterization data for each facet is used to reduce scan jitter and/or scan line variation.

Figure 3:
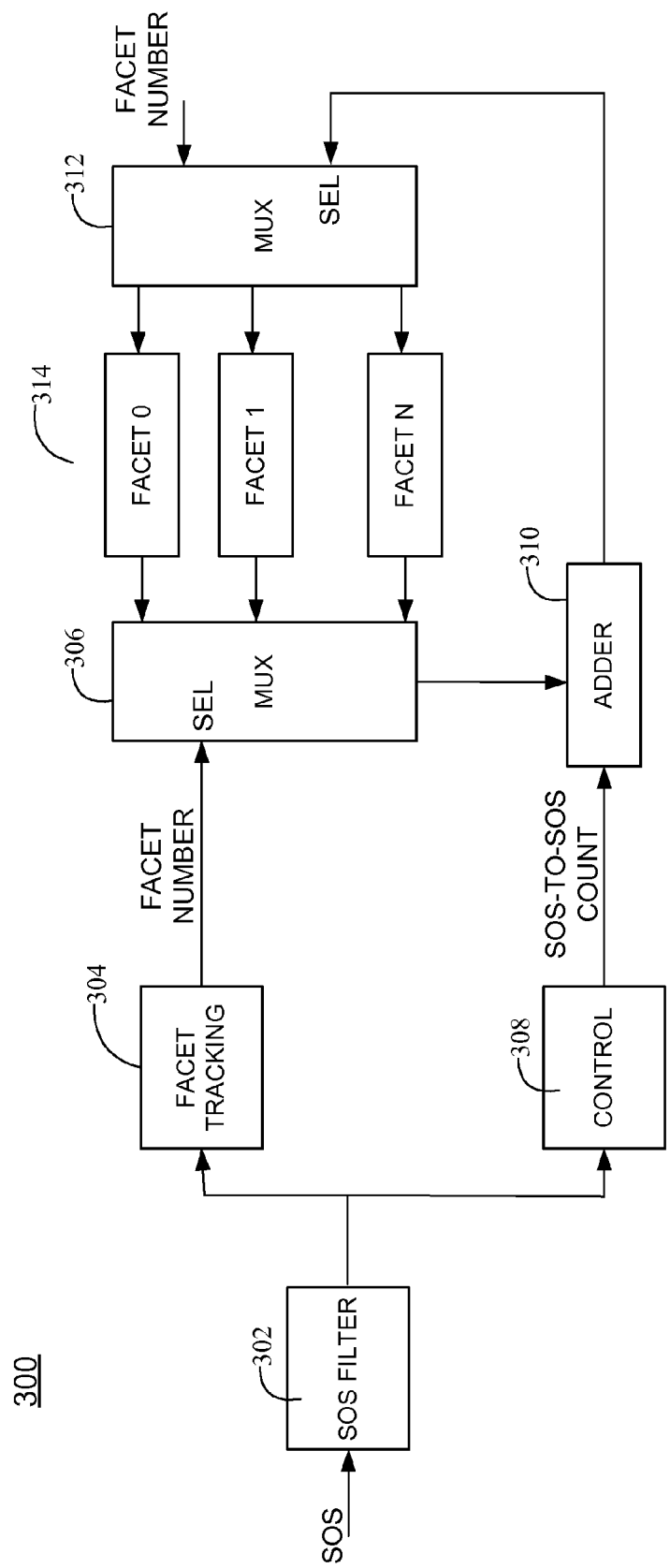
FIG. 3 is a block diagram of circuitry for measuring and tracking hsync-to-hsync delays according to an example embodiment.

FIG. 3 is a block diagram of circuitry 300 utilized for determining hsync-to-hsync delays, i.e., the time delays associated with each facet of minor 718. Circuitry 300 may be used in both image forming apparatus 700, such as in an ASIC communicatively coupled to controller 702, as well as in test equipment used at the time of manufacture. For each channel, circuitry 300 captures and accumulates the time between SOS signal assertions on a per facet basis for a specified number of scanner rotations. In particular, circuitry 300 receives the SOS signal generated by hsync sensor 720. Hsync sensor 720 asserts its SOS signal each time its corresponding laser beam impinges the sensor. A filter 302 receives the SOS signal and generates a filtered SOS at its output. A facet tracking block 304 receives the filtered SOS signal and tracks the particular facet of mirror 718 used in generating the recent assertion of the SOS signal. The output of facet tracking block 304 is at least one signal which is used to select, via multiplexer circuit 306, previously recorded delay data for the selected mirror facet.

Circuitry 300 further includes control circuitry 308 which receives the filtered SOS signal from filter 302 and a clock signal. The clock signal may be a multiple of the pel clock signal used in delivering video data for each channel of the LSU. Control circuitry 308 includes timer circuitry for generating an output signal of the delay, measured in cycles of the input clock signal, between assertions of the SOS signal. An adder or accumulator 310 receives the SOS assertion delay and the previously recorded facet timing data and generates a sum thereof which is placed at the output of adder 310. A demultiplexer 312 receives the delay sum output of adder 310 and provides same to an output of demultiplexer 312 as selected by the output of facet tracking block 304. Storage 314, which may be implemented as volatile or nonvolatile memory, registers, latches or the like, maintains the delay sum information for each facet of mirror 104.

The operation of circuitry 300 is as follows. Storage 314 maintains previously determined facet delay information for each facet of mirror 718. Hsync sensor 720 asserts the SOS signal each time a facet of mirror 718 reflects its corresponding laser beam onto the sensor. The SOS signal is received and filtered by filter 302. Facet tracking block 304 tracks the particular facet of mirror 718 which deflected the laser beam and generates a selection signal indicating the particular facet. The selection signal selects the previously determined facet delay information for the particular facet and provides same to adder 310. Meanwhile, control block 308 counts the amount of delay between successive assertions of the SOS signal and provides the delay amount to adder 310, which adds the previously determined facet delay information for the particular mirror facet and the delay between successive SOS signal assertions to obtain a delay sum signal. The delay sum signal is then provided to storage 314 for the particular mirror facet selected. In the example embodiment, the newly generated delay sum signal may replace the previously determined facet delay information for the selected mirror facet identified by facet tracking block 304. This procedure then repeats for each mirror facet for a predetermined number of revolutions of mirror 718. At the end of the predetermined number of revolutions, each location of storage 314 includes the sum of the accumulated delay times for each facet of mirror 718. At the completion of the mirror facet delay measurements, the accumulated delay times maintained in storage 314 may be placed in a buffer (not shown) in which a number of sets of previously measured accumulated delay times may be maintained. The buffer may discard the oldest accumulated delay times when a new set thereof is provided to the buffer.

Figure 4:
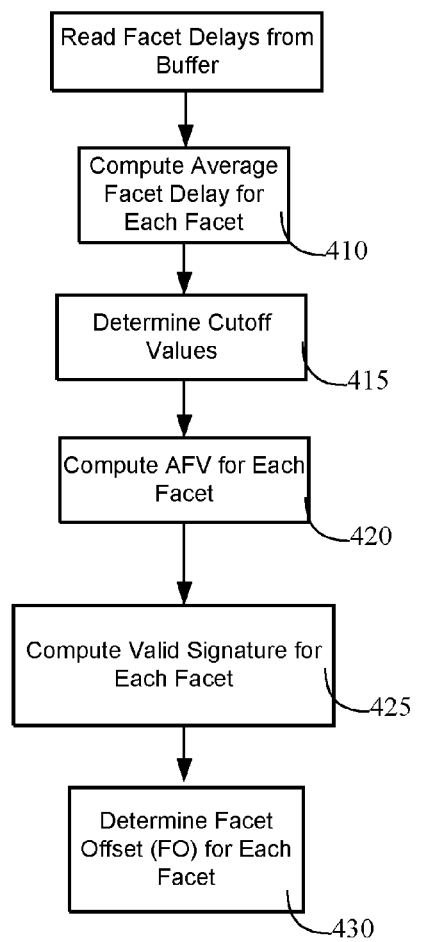
FIG. 4 is a flowchart and corresponding graphs for determining facet offset values according to an example embodiment.
Figure 4:
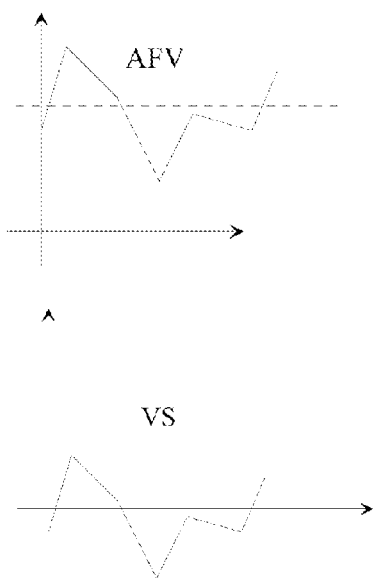

With the above-mentioned buffer containing accumulated delay times for each facet of mirror 718, the test equipment (for characterizing LSU 714 at the time of manufacture) and controller 702 associated with LSU 714 (during operation of image forming apparatus 700) determine a signature value to use in triggering the application of video data for use with each facet of mirror 718 to reduce scan jitter, for example. With reference to FIG. 4, for each facet of mirror 718, an average delay time value is computed at 410. For each mirror facet, this may be the average of the delay times maintained in the buffer. Next, at 415 minimum and maximum cutoff values may be determined based at least in part on the average delay time computed at 410. Using the cutoff values, the controller 702 and the test equipment compute at 420 an average facet value (AFV) for each facet of mirror 718 by discarding values falling outside of the region bounded by the minimum and maximum cutoff values. The AFV for each mirror facet may be maintained in memory.

Next, the test equipment (for characterizing during manufacture) and controller 702 (for characterizing during use of image forming apparatus 700) determine a valid signature VS for each mirror facet at 425 by computing an average of the AFVs of the mirror facets and subtracting the average from each AFV. The valid signatures VS of the mirror facets are signed values indicating facet time variation and may be seen as being related to scan jitter and scan line length variation. The valid signatures VS for the mirror facets of mirror 718 may be seen as a facet map signature, which in this case is a signed floating point vector of size n, with n equaling the number of facets of mirror 718.

For scan systems having an on-axis architecture, start of scan variation is largely sufficient to determine the correction distance. Accordingly, for each mirror facet, controller 702 of an on-axis system also calculates at 430 a facet offset FO by scaling the valid signature VS of the facet computed by controller 702 by a predetermined factor K and adding to the scaled result a predetermined offset. The predetermined factor is selected to ensure each facet offset FO is a positive value. The facet offset FO of a mirror facet is used in the LSU system in triggering the inclusion of video data in the laser beam when reflecting from the mirror facet.

For a scan system having an off-axis architecture, however, the start of scan variation is not sufficient to provide a correction distance to address scan jitter. Therefore, when the test equipment is used in determining the timing facet timing information, the valid signature along with the clock frequency and the speed of the motor is stored in memory of image forming apparatus 700. The test equipment may also capture, through use of a camera directed at the photoconductive drum, the pel variation pattern at at least two locations in a scan line—at the start of scan and at the end of scan. This results in pel variation information for each facet of mirror 718. The pel variation at the start of a scan line is stored for reducing scan jitter and the pel variation at the end of a scan line, when subtracted from the start of scan pel variation, is stored for reducing variation in line length. The information stored in the memory device is stored in such a way that the information describing the variation in facet 0, for example, substantially matches the corrections for facet 0.

When image forming apparatus 700 having an off-axis scan architecture is in use, such as when controller 702 begins a print job, controller 702 executes firmware for computing a signature for each facet of mirror 718 as described above. As mentioned, an ASIC or other circuitry associated with controller 702 includes circuitry 300 for generating accumulated delay information for each facet of mirror 718 over a predetermined number of mirror revolutions and storing the accumulated delay information in storage 314. Controller 702 then determines the valid signature VS for each facet based upon the accumulated delay information and thereby generates a new facet map signature as a signed floating point vector of size n, with n equaling the number of facets of mirror 718. At this time, image forming apparatus 700 includes two sets of information—a facet map signature vector determined both at the time of manufacture and at the beginning of a print job.

Unfortunately, it is possible that the facet map signature determined during the operation of image forming apparatus 700 is not aligned on a facet-by-facet basis with the facet map signature previously stored in the memory device at the time of manufacture. As a result, controller 702 utilizes firmware having a pattern matching algorithm to match the facet data recently computed by controller 702 with the facet data computed at the time of manufacture. In accordance with an example embodiment, controller 702 scales the recently determined facet map signature based on its sample clock and the mirror motor speed (in RPM). In general, a calculation is made between the facet map signature determined at the time of manufacture and the facet map signature shifted each of a number of times corresponding to the number of facets of minor 718, thereby resulting in a number of calculation values equaling the number of mirror facets. The calculation value having the largest value, for example, is selected, which indicates how the facet information determined at the time of manufacture should match the facets of mirror 718 when correcting for scan jitter and scan line length variation on a facet-by-facet basis.

It is understood that any of a number of pattern matching algorithms may be utilized to best match facet data to the facets of mirror 718. According to an example embodiment, the facet map signature vector determined during operation of image forming apparatus 700 is "dotted" with a shifted facet map signature vector determined at the time of manufacture and divided by both the magnitude of the recently determined facet map signature and the magnitude of the shifted facet map signature vector. This calculation yields a result of +1 for perfectly matching facet map signature vectors, while the result for non-matching facet map signature vectors approach a value of −1. Controller 702 may, for example, use a cutoff threshold of about 0.9 as an indicator of matched signature vectors.

In rare circumstances, the facet signature will be shaped in such a way that the vector calculation results in two or more values that are close to +1. This would be the case for signatures that are substantially mirror images of each other. If this was the case and the scan jitter was low, then the test equipment may indicate that a correction is not needed via information in memory. If scan jitter was high and the signature had a similarity issue, the test equipment would reject that particular LSU.

A sample code listing for matching facet map signature vectors is illustrated in FIG. 7 according to another example embodiment. The distance D from one vector V to another vector W is given by the following equation:

$$D=\sqrt{\Sigma(V_j-W_j)^2} \text{ for } j=0 \text{ to } n-1,$$

where n equals the number of facets of mirror 718. A match is considered valid when the nearest neighbor to the match is considered to be far from the matching vector. The nearest neighbor ratio is computed by dividing the distance of the second smallest distance D by the smallest distance D. From the code listing in FIG. 8, the pSumValues array is sorted from minimum to maximum and the nearest neighbor ratio R is determined by $$R=p\text{SumValues }[1]/p\text{SumValues }[0]$$

A perfect match occurs when the smallest distance D is 0 and the other distances are large values.

In addition, it may be useful to convert vector distances into a normalized distance by dividing the distance by the root mean square (RMS) value of the vector components. The RMS value of the vector components is given by $$\text{RMS}(V)=\sqrt{\Sigma(V_j)^2} \text{ for } j=0 \text{ to } n-1,$$

where n equals to the number of facets of mirror 718. The normalized distances, then, are distances divided by RMS (V).

In another embodiment, the facet map signature vector may be extended with signature derivative information. For example, a polygonal mirror may yield a facet map signature with eight components. Extending the size of the facet map signature vector to, for example, 15 may yield improved classification. In this example, the additional seven components of the facet map signature vector correspond to the change in value of each original facet signature value. This approach may be extended further by augmenting the facet map signature vector with higher derivatives. In this case, the additional components may be the derivatives of the previous extension. This would result in a facet map signature vector for an eight sided rotating minor having a total of 35 components.

Once controller 702 having an off-axis scan architecture matches the facet map signature information, a correction is applied. Scan jitter correction is performed and, for laser scan systems containing line length per facet correction hardware, the line length of each scan line is corrected. Specifically, with the pattern matching of the facet map signatures complete, controller 702 is able to assign to each facet of mirror 718 the particular facet pel variation information that was captured at the time of manufacture. In this case, the assigned pel variation information for each facet is considered as the facet offset FO value for each facet.

Figure 5:
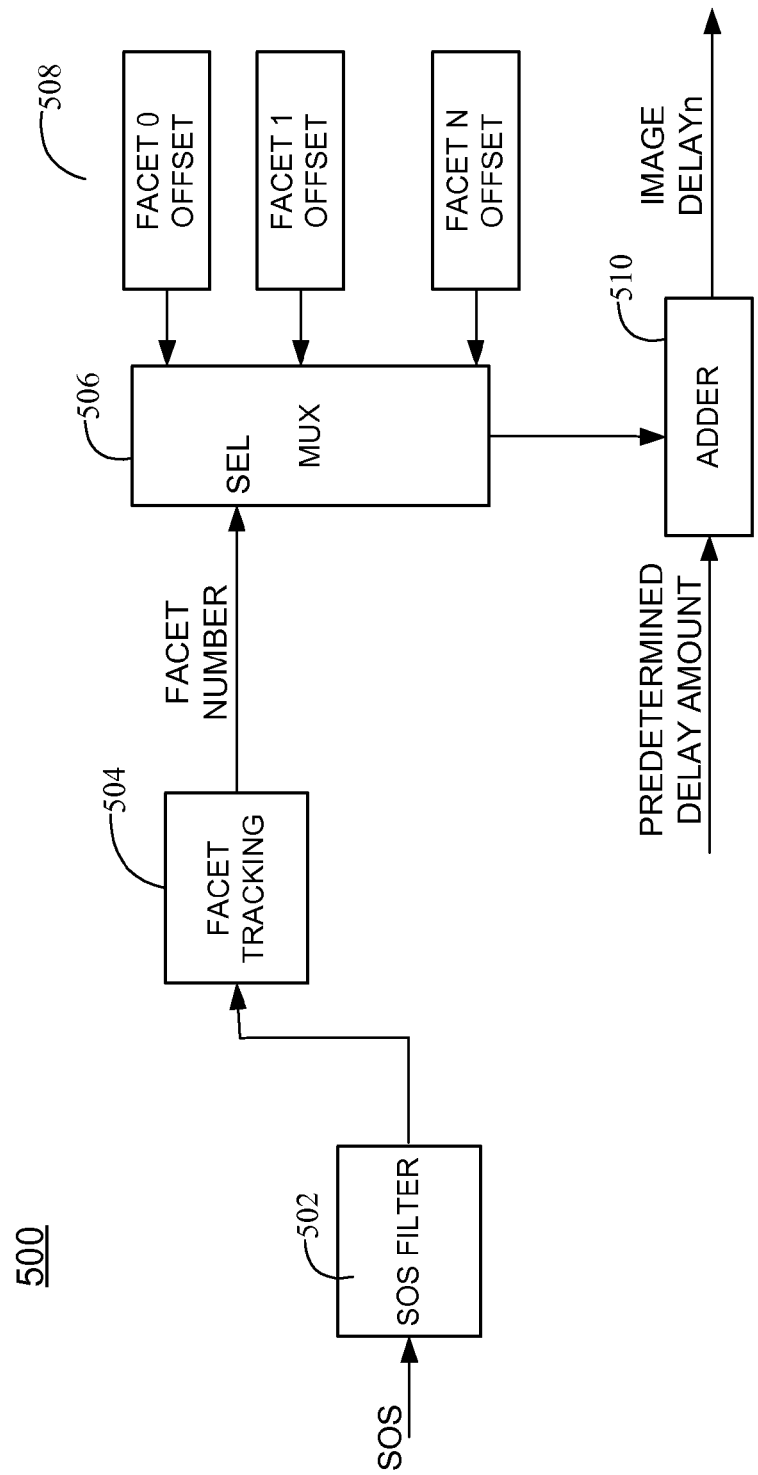
FIG. 5 is a block diagram of circuitry for utilizing the determined facet offset values for reducing scan jitter according to an example embodiment.

With reference to FIG. 5, there is shown a block diagram of the facet offset circuitry 500 appearing in image forming apparatus 700 for scan line shift (scan jitter) using the facet offsets FO values for triggering video data in the laser beams for impingement on the photoconductive drums. In one example embodiment, blocks of circuitry 300 (FIG. 3) that are common may be utilized in facet offset circuitry 500 in order to reduce circuit (chip and/or board) size. In another example embodiment, each of the blocks of facet offset circuitry 500 may be separate from the blocks used in circuitry 300. The description of facet offset circuitry 500 will be described following the latter example embodiment.

A SOS filter 502 may receive the SOS signal from the hsync sensor 720 and generate a filtered version thereof at its output. A facet tracking block 504 receives the filtered SOS signal and tracks the particular facet used in generating the SOS signal. The output of facet tracking block 504 is at least one signal which selects the facet offset FO value for the particular facet tracked. In particular, the output of facet tracking block 504 is the selection input of multiplexer circuitry 506, which includes a data input for each facet offset FO maintained in storage 508. In this way, facet tracking block 504 tracks the current facet used in generating the most recent assertion of the SOS signal and selects the facet offset FO value corresponding to the current facet.

Figure 6:
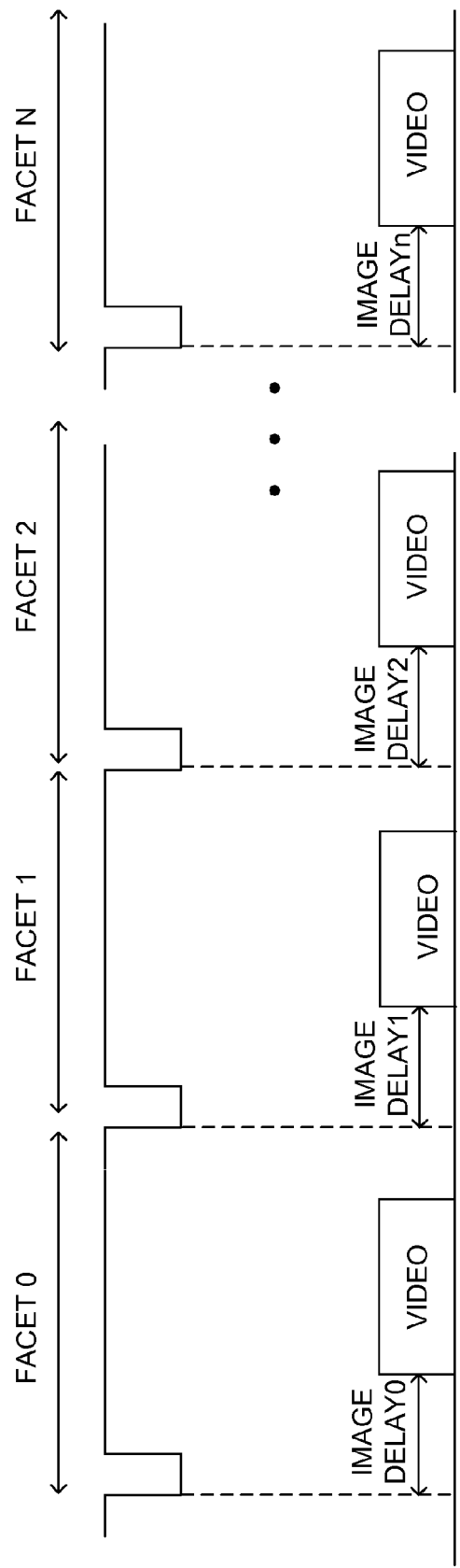
FIG. 6 illustrates the results of utilizing the determined facet offset values of FIG. 5.

An adder or accumulator 510 receives a predetermined image delay value at a first input and the output of multiplexer circuitry 506 at a second input, and generates a sum of thereof at the output of adder 510. In an example embodiment, the predetermined image delay value may be a constant. Thus the sum output of adder 510 is an image delay value for the current mirror facet that is based in part upon the facet offset FO value corresponding thereto. This image delay value is an amount of delay following the assertion of the SOS signal before video data is included in the laser signal. FIG. 6 illustrates the use of the image delay value of each facet of mirror 718 used by each channel. As can be seen, the video to be reflected from a particular facet of mirror 718 is delayed by the image delay value corresponding to the particular facet. By providing a correction factor, in this case a unique facet offset FO for each mirror facet, scan jitter is substantially reduced.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A laser scan unit for an imaging device, comprising:
   a rotating mirror having a plurality of facets;
   a plurality of laser sources, each laser source positioned in proximity to the rotating mirror for generating a laser beam directed thereat;
   sensing circuitry for receiving at least one of the laser beams reflected by the facets of the rotating minor and for generating a corresponding horizontal synchronization signal in response to the reception; and
   a controller operably coupled to the rotating mirror, the laser sources and the optical sensor, and configured to determine a facet map signature based upon the horizontal synchronization signal, the facet map signature comprising a vector of a size corresponding to a number of facets of the rotating minor;

match, on a per facet basis, the determined facet map signature to a previously stored facet map signature; and determine a unique time delay for each facet of the rotating minor based upon the match, and control the laser sources so that video provided by each laser source is delayed in a scan line by the unique time delay corresponding to the facet of the rotating mirror used in creating the scan line.

2. The laser scan unit of claim 1, further comprising first circuitry having an input coupled to receive the horizontal synchronization signal, the first circuitry for measuring a time duration between successive assertions of the horizontal synchronization signal and providing a measured time duration corresponding to each facet of the rotating mirror.

3. The laser scan unit of claim 2, wherein the first circuitry comprises second circuitry having an input coupled to the horizontal synchronization signal and an output, for tracking the facet of the rotating mirror most recently used in generating an assertion of the horizontal synchronization signal.

4. The laser scan unit of claim 3, wherein the first circuitry further comprises third circuitry for storing, for each facet of the rotating mirror, an accumulation of the time durations, and an adder circuit having a first input corresponding to a measured time duration from the most recent assertion of the horizontal synchronization signal, a second input coupled to an output of the third circuitry and an output coupled to an input thereof, the output of the adder circuit generating the accumulation of time durations for each facet of the rotating minor over a predetermined number of revolutions thereof.

5. The laser scan unit of claim 1, wherein the controller is configured to determine, for each facet of the rotating mirror, a facet offset value based upon an average time delay between successive assertions of the horizontal synchronization signal corresponding to the facet, and to delay transmission of video data by the laser sources by at least the facet offset value, the facet offset value comprising the unique delay time.

6. The laser scan unit of claim 5, wherein the controller determines the facet map signature as a number of vector components equaling the number of facets in the rotating mirror, each vector component being based upon the average time delay thereof, the facet offset for each facet of the rotating mirror being based upon the corresponding vector component of the facet map signature.

7. The laser scan unit of claim 6, wherein for each facet of the rotating mirror, the controller scales the facet signature by a predetermined factor to produce a scaled signature and adds a predetermined amount to the scaled signature to determine the facet offset value.

8. The laser scan unit of claim 1, wherein the controller matches the determined facet map signature to a previously stored facet map signature by shifting one of the determined facet map signature and the previously stored facet map signature relative to the other a number of times corresponding to a number of facets of the rotating minor, combining the facet map signature not shifted with each shifted facet map signature, and selecting the combination indicative of a best facet-to-facet match between the determined facet map signature and the previously stored facet map signature.

9. A method of controlling a laser scan unit of an imaging device, comprising:

rotating a mirror having a plurality of facets;

directing a plurality of light beams towards the mirror;

sensing, by sensing circuitry, at least one light beam of the plurality of light beams reflected from the minor;

generating a synchronization signal based upon the sensing of the first light beam;

generating a scan pattern from a plurality of scan lines created by each light beam reflecting from the mirror; and determining, by control circuitry, a facet map signature based upon the horizontal synchronization signal, the facet map signature comprising a vector of a size corresponding to a number of facets of the rotating mirror;

matching, on a per facet basis, the determined facet map signature to a previously stored facet map signature; and determining a unique time delay for each facet of the rotating minor based in part upon the synchronization signal and the match, and controlling the laser beams directed towards the minor so that video data provided in the light beams is delayed in a scan line by the unique time delay corresponding to the facet of the rotating mirror used in creating the scan line.

10. The method of claim 9, wherein the determining a unique time delay comprises measuring a time duration between successive assertions of the synchronization signal and providing a measured time duration corresponding to each facet of the rotating mirror.

11. The method of claim 10, wherein the determining a unique time delay further comprises generating, for each facet, an accumulated time duration from a plurality of the measured time durations taken during rotating the mirror a predetermined number of revolutions, and saving the accumulated time duration in memory, and wherein the facet map signature is based in part upon the accumulated time duration.

12. The method of claim 11, wherein the determining a unique time delay further comprises, for each facet, averaging the accumulated time durations stored in the memory, wherein the facet map signature is determined based upon the averaged accumulated time durations, and generating a facet offset value by scaling the signature value and adding a predetermined value thereto, wherein the facet offset value comprises the unique time delay.

13. The method of claim 9, wherein the determining a unique time delay further comprises, for each facet of the mirror, determining a plurality of delay values associated with each facet of the mirror, averaging the delay values, calculating a signature from the averaged delay value and determining the unique time delay by scaling the signature and adding a predetermined value thereto.

14. The method of claim 9, wherein the matching comprises shifting one of the determined facet map signature and the previously stored facet map signature relative to the other a number of times corresponding to a number of facets of the rotating mirror, combining the facet map signature not shifted with each shifted facet map signature, and selecting the combination indicative of a best facet-to-facet match between the determined facet map signature and the previously stored facet map signature.

15. A laser scan unit for an imaging device, comprising:

a rotating mirror having a plurality of facets;

one or more laser sources, each laser source positioned in proximity to the rotating mirror for generating a laser beam directed thereat;

sensing circuitry for receiving one or more laser beams reflected by the facets of the rotating minor and for generating a corresponding horizontal synchronization signal in response to the reception; and a controller operably coupled to the rotating mirror, the laser sources and the optical sensor, and configured to determine a facet map signature based upon the horizontal synchronization signal, the facet map signature comprising a vector of a size corresponding to a number of facets of the rotating mirror;

match, on a per facet basis, the determined facet map signature to a previously stored facet map signature; and determine a unique time delay for each facet of the rotating mirror based upon the match, and control the one or more laser sources so that video provided by each laser source is delayed in a scan line by the unique time delay corresponding to the facet of the rotating mirror used in creating the scan line.

16. The laser scan unit of claim 15, further comprising first circuitry having an input coupled to receive the horizontal synchronization signal, the first circuitry for measuring a time duration between successive assertions of the horizontal synchronization signal and providing a measured time duration corresponding to each facet of the rotating mirror.

17. The laser scan unit of claim 16, wherein the first circuitry comprises second circuitry having an input coupled to the horizontal synchronization signal and an output, for tracking the facet of the rotating mirror most recently used in generating an assertion of the horizontal synchronization signal.

18. The laser scan unit of claim 17, wherein the first circuitry further comprises third circuitry for storing, for each facet of the rotating mirror, an accumulation of the time durations, and an adder circuit having a first input corresponding to a measured time duration from the most recent assertion of the horizontal synchronization signal, a second input coupled to an output of the third circuitry and an output coupled to an input thereof, the output of the adder circuit generating the accumulation of time durations for each facet of the rotating minor over a predetermined number of revolutions thereof.

19. The laser scan unit of claim 15, wherein the controller is configured to determine, for each facet of the rotating mirror, a facet offset value based upon an average time delay between successive assertions of the horizontal synchronization signal corresponding to the facet, and to delay transmission of video data by the laser sources by at least the facet offset value, the facet offset value comprising the unique delay time.

20. The laser scan unit of claim 19, wherein the controller determines the facet map signature as a number of vector components equaling the number of facets in the rotating mirror, each vector component being based upon the average time delay thereof, the facet offset for each facet of the rotating mirror being based upon the corresponding vector component of the facet map signature.

* * * * *